United States Patent
Magnusen et al.

(10) Patent No.: US 7,813,707 B2
(45) Date of Patent: Oct. 12, 2010

(54) HIGH-PERFORMANCE BIPOLAR TUNER SOLUTION SYSTEMS AND METHODS

(75) Inventors: Timothy M. Magnusen, Murphy, TX (US); Gregory J. Zancewicz, Melissa, TX (US); Jaime Chunda, Austin, TX (US)

(73) Assignee: Microtune (Texas), L.P., Plano, TX (US)

( * ) Notice: Subject to any disclaimer, the term of this patent is extended or adjusted under 35 U.S.C. 154(b) by 1009 days.

(21) Appl. No.: 11/557,365

(22) Filed: Nov. 7, 2006

(65) Prior Publication Data

US 2008/0106652 A1 May 8, 2008

(51) Int. Cl.
*H04B 1/16* (2006.01)
(52) U.S. Cl. .................... 455/179.1; 348/731
(58) Field of Classification Search .............. 455/150.1, 455/179.1, 180.1–180.3, 182.1, 182.3, 184.1, 455/260, 266; 348/731, 724, 735
See application file for complete search history.

(56) References Cited

U.S. PATENT DOCUMENTS

| | | | |
|---|---|---|---|
| 6,944,121 B1 | 9/2005 | Weste et al. | |
| 6,995,808 B2 * | 2/2006 | Kovacic et al. | 348/731 |
| 7,120,413 B2 * | 10/2006 | Lee et al. | 455/260 |
| 7,187,913 B1 * | 3/2007 | Rahn et al. | 455/188.1 |
| 2006/0071845 A1 | 4/2006 | Stroili et al. | |

OTHER PUBLICATIONS

International Search Report and Written Opinion issued for PCT/US2007/083116; Dated: Apr. 3, 2008; 12 Pages.
Author unknown, "GNU Radio—The GNU Software Radio", Internet website article retrieved from http://www.gnu.org/software/gnuradio/gnuradio.html, retrieved Oct. 25, 2006, pp. 1-4.
Author unknown, "GNU Radio—HDTV Snapshots", Internet website article retrieved from http://www.gnu.org/software/gnuradio/hdtv-samples.html, retrieved Aug. 3, 2006, pp. 1-3.

* cited by examiner

*Primary Examiner*—Thanh C Le
(74) *Attorney, Agent, or Firm*—Fulbright & Jaworski L.L.P.

(57) ABSTRACT

A system for processing signals comprises a tuner and an input/output (IO) bus bridge, wherein the tuner and the IO bus bridge are formed at least in part on same semiconductor chip, and wherein at least a portion of logic on the chip is implemented in Complementary Metal Oxide Semiconductor (CMOS) logic, and wherein at least another portion of the logic is implemented with silicon germanium (SiGe) logic.

22 Claims, 2 Drawing Sheets

HIGH-PERFORMANCE BIPOLAR TUNER SOLUTION SYSTEMS AND METHODS

TECHNICAL FIELD

The present description relates, in general, to signal processing devices, and, more specifically, to semiconductor-based tuner systems.

BACKGROUND OF THE INVENTION

Personal Computer Television (PCTV) is a technique that allows a computer to be used as a television, e.g., to accept and display signals from an antenna, Video Cassette Recorder (VCR), camcorder, or the like. Current PCTV solutions usually contain three parts: a Radio Frequency (RF) tuner, a demodulator, and an interface to the Personal Computer (PC). The RF tuner selects one channel out of a plurality of channels from an input, such as an antenna input or cable input. The demodulator converts the single channel data from the tuner to a raw data output, usually baseband. The PC interface, or bridge, transports the raw data to the PC for the intended use.

Typically, the tuner, demodulator, and interface are included in an external system that feeds into a data bus for the computer. In that architecture, a hardware unit demodulates the data from the channel. Since the demodulator is hardware-based, its functionality is fixed. Typically, there is a lot of die area and cost involved with making a hardware demodulator, especially considering that most PCs have enough processing power to perform demodulation.

Thus, some solutions have included a tuner and a PC interface in an external unit and employed a software-based demodulator running on the PC. A disadvantage of some of those solutions is that they tend to be bulky and large, even in spite of the fact that the demodulator is software-based.

There is currently no solution available that provides an efficient distribution of signal processing functionality, while at the same time providing a convenient package that can be used with a variety of computers, such as laptops, cable modems, and the like.

BRIEF SUMMARY OF THE INVENTION

The present invention is directed to systems and methods for processing signals using a semiconductor chip-based device that includes a Radio Frequency (RF) tuner and a PC bus interface. In one example embodiment, the tuner and the PC bus interface are integrated on a semiconductor chip. The semiconductor chip preferably comprises an SiGe chip, which can allow for implementing some devices with higher-performance SiGe bipolar transistors, while also allowing for implementing other devices using lower-performance CMOS technology. Therefore, devices that benefit from the properties of SiGe can be implemented in SiGe, whereas devices that are more optimally implemented in CMOS can be implemented in CMOS—all on the same semiconductor chip. Such optimizing can provide an opportunity for greater miniaturization and less power use, thereby allowing some designs to be compact enough to fit into form factors for standard PC cards (e.g., Peripheral Component Interconnect (PCI), PCI Express, and the like).

Some embodiments may include additional features, such as an analog-to-digital converter (ADC) and/or an auxiliary input and in bidirectional embodiments, a digital-to-analog converter (DAC) and/or an auxiliary output. In some embodiments, the tuner, PC bus interface, and ADC (if included) are driven by the same clock, thereby facilitating synchronization in the components.

A method for making a signal processing system according to one or more embodiments of the present invention may include disposing a signal tuner on a semiconductor chip and disposing a PC bus interface on the chip, wherein the chip is a SiGe chip, and wherein at least some of the logic is implemented in SiGe and other logic is implemented in CMOS.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
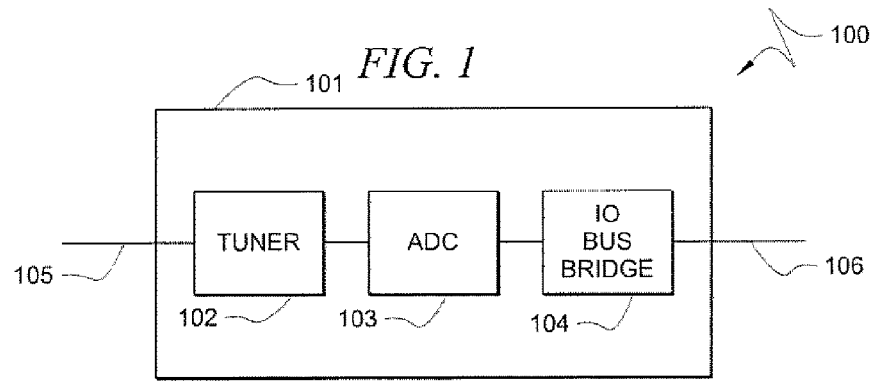
FIG. 1 is an illustration of an exemplary system adapted according to one embodiment of the invention.

FIG. 1 is an illustration of exemplary system 100 adapted according to one embodiment of the invention. System 100 is a semiconductor chip-based signal processing system. System 100 includes semiconductor chip 101 with input 105 and output 106. Signal tuner 102, analog-to-digital converter (ADC) 103, and input/output (IO) bus bridge 104 are each at least partially disposed on semiconductor chip 101. (Systems that receive and process signals that are digitized e.g., may omit ADC 103.) System 100 can include a variety of configurations. For example, signal tuner 102 can be a single- or multi-conversion tuner with one or more local oscillators, mixers, and Intermediate Frequency (IF) filters. Furthers I/O bus bridge 104 can be any component adapted to drive signals on a processor bus or another bus bridge (e.g, a Northbridge or Southbridge in INTEL™ architecture). Example I/O bus bridges use one or more buffer amplifiers to drive signals from other components on the chip. Semiconductor chip 101 is a silicon germanium (SiGe) chip that has at least a layer of silicon and at least a layer of germanium so that some logic can be implemented in silicon (e.g., Complementary Metal Oxide Semiconductor (CMOS) logic), while other logic can be implemented in high-performance SiGe. In the example of FIG. 1, tuner 102 and ADC 103 are implemented in SiGe and some portions of IO bus bridge 104 are implemented in SiGe while others are implemented in silicon CMOS. System 100, therefore, uses SiGe for portions that benefit from the high performance properties thereof and uses silicon CMOS for portions that either do not benefit from the properties of SiGe or are more efficiently made in CMOS. The benefits of SiGe versus CMOS are explained in more detail below. Various embodiments of the present invention may be adapted to work with one or more of a variety of processor-based devices, e.g. laptop computers, desktop computers, cable modems, cellular phones, Personal Digital Assistants (PDAs), and the like. In some examples, system 100 is included in a card (e.g., a PCI card or other card) and inserted into a slot in a host computer, such that system 100 interfaces with a processor in the host, thereby enabling the host to receive and display RF signals.

Figure 2:
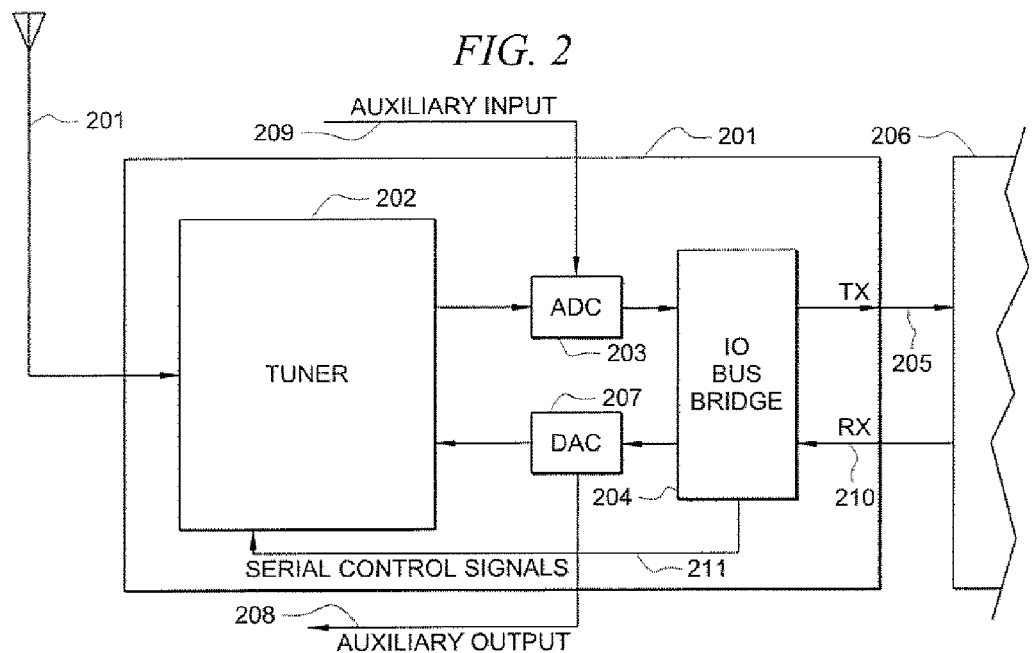
FIG. 2 is an illustration of an exemplary system adapted according to one embodiment of the invention.

FIG. 2 is an illustration of exemplary system 200 adapted according to one embodiment of the invention. System 200 is a block diagram of an example signal processing device and is an embodiment according to the schematic configuration of FIG. 1 with more detail shown.

System 200 includes broadband input 201, which in this example is shown as an antenna input, but in other embodiments can be any kind of broadband input including, e.g., coaxial cable television and/or network input, fiber optic input, or other kind of input that can transmit two or more channels of information. Examples of types of input signals that can be received and processed include, e.g., analog television (TV) signals, digital TV signals, High-Definition Television (HDTV) signals, Data Over Cable Service Interface Specification (DOCSIS) signals, and the like.

The broadband input is sent to tuner 202, which "locks" onto one or more selected channels of the broadband signal and outputs a signal that contains the selected information. In various embodiments the tuner output signal may be an Intermediate Frequency (IF) signal, a baseband signal, or a combination thereof.

The tuner output signal is input into ADC 203, which converts the tuner output signal into a digital signal, which is sent to IO bus bridge 204. IO bus bridge 204 includes interfaces that allow for receiving and transmitting signals to another device's (e.g., a computer's) IO bus.

A specific example of an IO bus bridge that can be used for bridge 204 is a bridge that interfaces the digitized tuner output signal to a Peripheral Component Interconnect Express (PCI Express) bus on a personal computer. Examples of other kinds of IO buses are the Universal Serial Bus, Peripheral Component Interconnect (PCI) bus, and the like. A PCI Express IO bus bridge can give system 200 an interface to a computer's PCI Express bus, which offers a high-speed, switched architecture peripheral connection to the processor (not shown). PCI Express generally has better performance than PCI and other kinds of buses. However, IO bus bridge 204 is not limited to being a PCI Express bridge in some embodiments and, in fact, can be any of a variety of bus bridges now known or later developed.

Output 205 of chip 201 can be a parallel or serial output that is sent to demodulator 206. When IO bus bridge 204 is a PCI Express interface, connections 205 and 210 are serial connections. In this example, demodulator 206 is a hardware- or software-based demodulator that is employed in a host, e.g., a computer. One such example is a software-based Personal Computer Television (PCTV) demodulator that allows a computer monitor to be used as a television screen.

System 200, in this example, is bidirectional. Thus, in addition to receiving signals from a broadband medium, it is possible to transmit signals to a broadband medium through input 201. In such an example, IO bus bridge 204 receives the digital information signal over input 210 from a modulating portion of unit 206. The digital signal is sent to digital-to-analog converter (DAC) 207, which produces an analog signal that is sent to tuner 202. Tuner 202 creates an RF signal from the received analog signal and outputs it to a transmission medium through input/output 201.

System 200 also includes auxiliary input and output 209 and 208, respectively. Auxiliary input 209 allows the receipt of an analog signal that is not an RF signal. Similarly, auxiliary output 208 provides for the output of an analog signal that is not an RF signal. Further, control line 211 allows for some control communication between IO bus bridge 204 and tuner 202.

As mentioned above, semiconductor chip 201 is preferably an SiGe chip that includes at least one layer of silicon and at least one layer of germanium. Transistors that are formed of SiGe are considered "high-performance." That is, SiGe transistors generally switch faster and use less power than similar CMOS transistors, which can also be formed on SiGe chip 201. In this example, much of tuner 202, ADC 204, and DAC 207 are built using SiGe components, thereby taking, advantage of the high-performance properties that SiGe offers so that tuner 202, ADC 204, and DAC 207 typically provide better performance at higher switching speeds with less power consumption than similar units of CMOS. Further, when tuner 202, ADC 204, and DAC 207 include SiGe technology, they are typically smaller than comparable CMOS units, such that system 200 can take advantage of some amount of miniaturization that is not available to CMOS-only designs. It should be noted that while tuner 202, ADC 204, and DAC 207 include SiGe transistors, there is no requirement that all transistors in those devices be SiGe.

Figure 3:
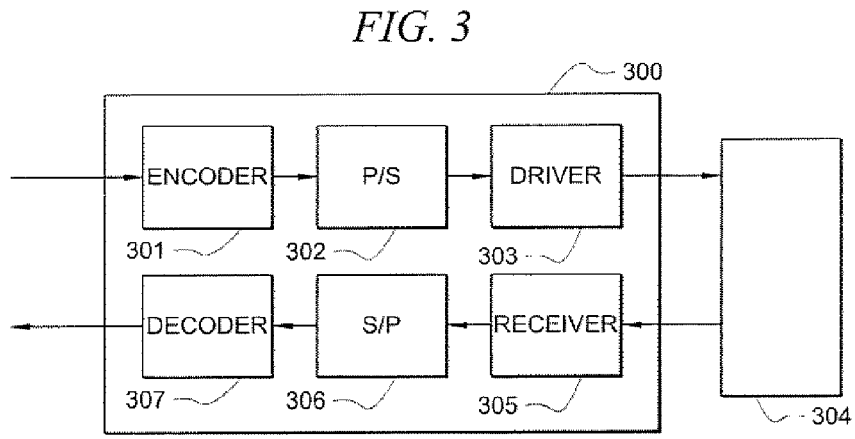
FIG. 3 is an illustration of an exemplary IO bus bridge adapted according to one embodiment.

Also in this example some portions of IO bus bridge 204 are implemented in CMOS, while other portions are implemented in SiGe, as explained with regard to FIG. 3. FIG. 3 is an illustration of exemplary IO bus bridge 300 adapted according to one embodiment that may be employed, e.g., in a PCI Express or Universal Serial Bus (USB) implementation. IO bus bridge 300 can be adapted for use in a signal processing system, such as, e.g, system 200 (FIG. 2), and in this example, is in communication with IO bus 304. IO bus bridge 300 includes encoder 301 that makes the signal more robust by, e.g., adding error correction code or other measures. IO bus bridge 300 also includes parallel-to-serial (P/S) converter 302 and output buffer amplifier 303. In the other direction, IO bus bridge 300 includes differential line receiver 305, serial-to-parallel (SIP) converter 306, and decoder 307, which undoes the coding by, e.g. removing error correction code and the like.

Output buffer amplifier 303 and differential line receiver 305 take advantage of high-performance SiGe bipolar transistors, using less power, fewer transistors, and less die area than comparable CMOS buffer amplifier and receivers. P/S converter 301 performs a conversion to a high speed serial output, and in this example, is implemented using high-performance SiGe bipolar transistors. Similarly, S/P converter 306 performs high-speed conversion and is implemented with high-performance SiGe transistors. In general, the use of SiGe bipolar transistors allows P/S converter 301 and S/P converter 306 to be smaller, laster, and to use less power than a similar converters implemented in CMOS. On the other hand, the functions of encoder 301 and decoder 307 tend to be computationally intensive and somewhat slower when compared to the various other components in IO bus bridge 300. Further, encoder 301 and decoder 307 employ high-density logic to provide their functionality. In this example, encoder 301 and decoder 307 are implemented using CMOS logic, which is generally more optimal for use in slower, high-density logic than are SiGe bipolars. In other words, IO bus bridge 300 uses SiGe elements when SiGe is more optimal, and also uses CMOS when CMOS is more optimal. By contrast, a system that uses a silicon chip to host an IO bus bridge is limited to CMOS logic, and thus, cannot take advantage of the benefits of SiGe for some components.

Figure 4:
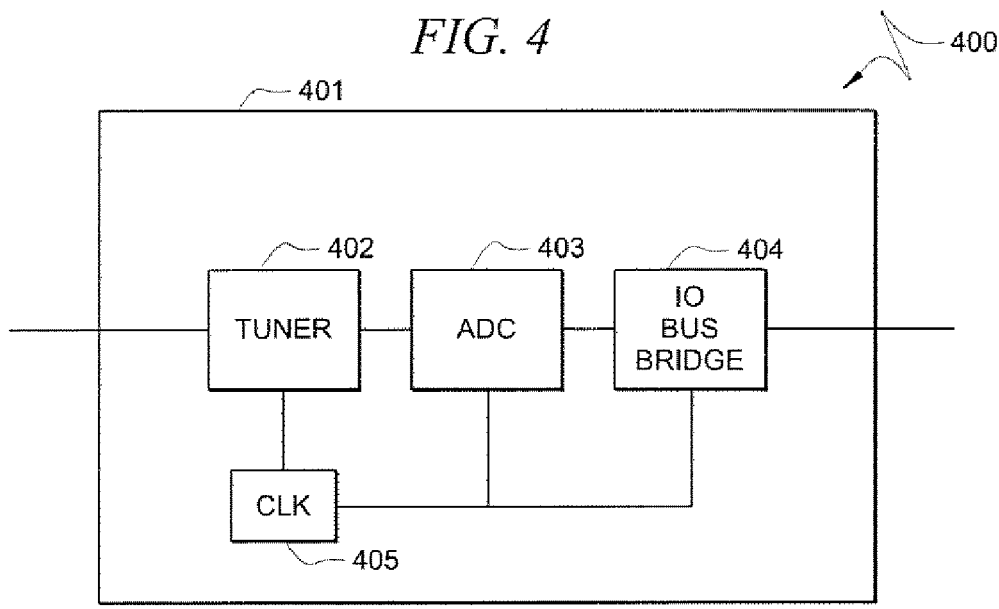
FIG. 4 is an illustration of an exemplary system adapted according to one embodiment of the invention.

FIG. 4 is an illustration of exemplary system 400 adapted according to one embodiment of the invention. System 400 conforms to the basic design of system 100 (FIG. 1) while showing some amount of detail of an exemplary clocking scheme for use therein. System 400 includes SiGe chip 401, tuner 402, ADC 403 IO bus bridge 404, and clock 405. Clock 405 is a high-performance clock with a frequency and precision high enough to be used at least with tuner 402, ADC 403, and IO bus bridge 404. In some embodiments, clock 405 may be an internal clock for tuner 402 that can also be distributed to other components. In this example, tuner 402, ADC 403, and IO bus bridge 404 are synchronized, since each uses clock 405. It should be noted that bidirectional systems can also include a DAC (not shown) that is synchronized. It should also be noted that one or more of tuner 402, ADC 403, and/or IO bus bridge 404 may include a frequency divider such that the various components are synchronized, although they may not be clocked at exactly the same frequencies.

Synchronization of tuner 402, ADC 403, and IO bus bridge 404 can provide for some advantages in various embodiments. For example, when IO bus bridge 404 is an interface for a PCI Express bus, synchronization can reduce the need for some components. Specifically, the PCI Express standard allows for buffering in memory of low-speed data coming to the bridge from, e.g., ADC 403, and it does not require synchronization. However, synchronization of ADC 403 and IO bus bridge 404 may obviate the need for some of the buffering that is included in or near prior art bus bridges. In fact, memory buffers are only one kind of interfacing element that can be eliminated from some embodiments, thereby requiring less die space.

Figure 5:
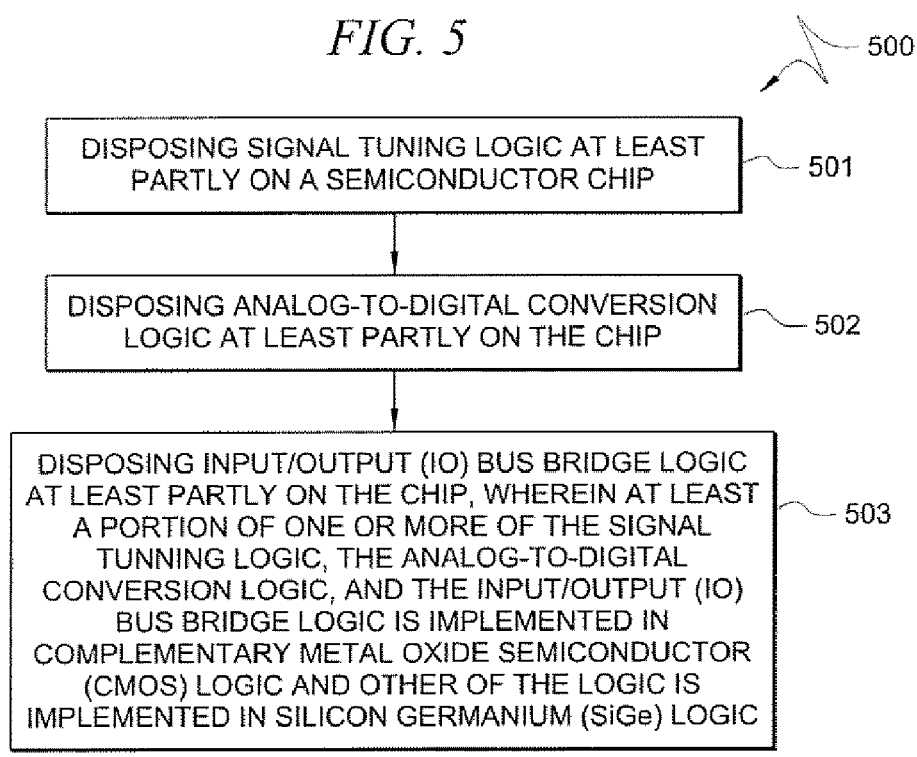
FIG. 5 is an illustration of an exemplary method adapted according to one embodiment of the invention for fabricating a signal processing system.

FIG. 5 is an illustration of exemplary method 500 adapted according to one embodiment of the invention for fabricating a signal processing system. Method 500 may be implement by, e.g., a control process for a semiconductor chip fabrication unit. In step 501, signal tuning logic is disposed at least partly on a semiconductor chip. In step 502, analog-to-digital conversion logic is disposed at least partly on the chip. In step 503, input/output (IO) bus bridge logic is disposed at least partly on the chip. In method 500, at least one of steps 510, 502, and 503 includes disposing the respective logic on the chip so that some of the respective logic is implemented in CMOS and other of the logic is implemented in SiGe. In one example, the signal tuning logic and the analog-to-digital conversion logic is implemented substantially in SiGe, and the input/output (IO) bus bridge logic includes one or more portions that are implemented in CMOS and one or more portions that are implemented in SiGe.

Although method 500 is illustrated as a series of steps, various embodiments of the invention are not limited thereto. For instance, in some embodiments, one or more of steps 501-503 may be performed at the same time or out of order. In another example, CMOS logic is disposed on the chip before SiGe logic is disposed, or vice versa. Method 500 may also include disposing digital-to-analog logic on the chip, or any of a variety of other logic now known or later developed.

In addition to any of the advantages described above, embodiments of the invention may include any of a variety of other advantages. For instance, a SiGe chip allows a designer to implement some devices in CMOS and others in SiGe, so that each device can be optimized, at least to the limits of its respective material.

Further, in the context of signal processing devices, SiGe generally offers better performance, power usage, and/or space usage than other materials/processes. This is because of the physical properties of SiGe bipolar designs, which provide faster performance at the same current level than comparably sized MOSFETs in a CMOS process. For instance, both gallium arsenide (GaAs) and indium phosphide (InP) are high-performance materials. However, GaAs and InP would generally require more die space in order to integrate a tuner and ADC tan would SiGe. Also, neither GaAs nor InP allows for high-performance and lower-performance materials on the same semiconductor chip. Further, Radio Frequency (RF) CMOS (another CMOS variety) is considered high-performance, but not as high-performance as SiGe, especially for use in a tuner, ADC, or IO bus bridge (generally, with greatest gains seen in the tuner, followed by the ADC, and least in the IO bus bridge).

Because of increased miniaturization on an SiGe chip, many embodiments can be made small enough to conveniently be used with desktop computers, laptop computers, cable modems, and the like. In fact, some embodiments can be disposed in a PCI Express card that can fit into a slot in a desktop computer or laptop computer. Smaller units are also more ideal for use with cable modems, since most consumers view cable modem space as wasted.

Still further, integrating a tuner, bridge, and ADC (if applicable) on the same chip results in space savings, not only because a single chip is almost always smaller than two chips, but also because interfacing components between the devices can often be eliminated. When devices are provided separately, those devices often are designed to receive an unknown signal or produce a signal for an unknown device. As a result, devices often are preceded or followed by one or more interfacing devices (e.g., memory buffers, resynchronizes, and the like). Such interfacing devices can often be eliminated when the more of the signal path is known during design time, thereby "freeing up" die space.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for processing signals, said system comprising:

a tuner;
an input/output (IO) bus bridge, wherein said tuner and said IO bus bridge are formed at least in part on a same semiconductor chip, and wherein at least a portion of logic on said chip is implemented in Complementary Metal Oxide Semiconductor (CMOS) logic, and wherein at least another portion of said logic is implemented with silicon germanium (SiGe) logic; and
an oscillating device in communication with each of said tuner and said IO bus bridge, adapted to provide a clock signal thereto, wherein said tuner and said IO bus bridge are synchronized by said clock signal.

2. The system of claim 1 wherein tuning and digital conversion functions are implemented on said chip, and wherein demodulation of signals is performed by a software process in a host computing device interfaced with said IO bus bridge.

3. The system of claim 1 wherein said IO bus bridge is a Peripheral Component Interconnect Express (PCI Express) interface.

4. The system of claim 1 wherein a serial-to-parallel converter and a parallel-to-serial converter in said IO bus bridge are implemented by SiGe bipolar transistors, and wherein an encoder associated with said parallel-to-serial converter and a decoder associated with said serial-to-parallel converter are implemented using CMOS.

5. The system claim 1 wherein said tuner is implemented by SiGe logic.

6. The system of claim 1 further comprising:
an analog to digital converter (ADC); and
a digital-to-analog converter (DAC); and
a Radio Frequency (RF) modulator, wherein said DAC and said RF modulator provide a signal path from said IO bus bridge to a broadband medium, and wherein said tuner and said ADC provide a signal path from said broadband medium to said IO bus bridge.

7. The system of claim 6 further comprising auxiliary inputs to said ADC.

8. The system of claim 1 wherein said CMOS logic is silicon logic.

9. A method for providing a signal processing system, said method comprising:
disposing signal tuning logic at least partly on a semiconductor chip;
disposing input/output (IO) bus bridge logic at least partly on said chip, wherein at least a portion of one or more of said signal tuning logic and said input/output (IO) bus bridge logic is implemented in Complementary Metal Oxide Semiconductor (CMOS) logic and other of said logic is implemented in silicon germanium (SiGe) logic; and
disposing an oscillating device in communication with each of said signal tuning logic and said IO bus bridge logic, said oscillating device adapted to synchronize operation of said signal tuning logic and said IO bus bridge logic.

10. The method of claim 9 further comprising:
disposing analog-to-digital conversion logic at least partly on said chip, wherein at least a portion of said analog-to-digital conversion logic is implemented in SiGe logic.

11. The method of claim 9 wherein said IO bus bridge is a Peripheral Component Interconnect Express (PCI Express) interface.

12. The method of claim 9 wherein said disposing input/output (IO) bus bridge logic comprises:
implementing a serial-to-parallel converter in said IO bus bridge by SiGe bipolar transistors;
implementing a decoder associated with said serial-to-parallel converter using CMOS logic;
implementing a parallel-to-serial converter in said IO bus bridge by SiGe bipolar transistors; and
implementing encoder associated with said s parallel-to-serial converter using CMOS logic.

13. The method claim 9 wherein said disposing signal tuning logic comprises:
implementing said signal tuning logic by said SiGe logic.

14. The method of claim 9 further comprising:
disposing analog-to-digital conversion logic on said chip;
disposing a digital-to-analog converter (DAC) on said chip; and
disposing a Radio Frequency (RF) modulator, wherein said DAC and said RF modulator provide a signal path from said IO bus bridge logic to a broadband medium, and wherein said signal tuning logic and said analog-to-digital conversion logic provide a signal path from said broadband medium to said IO bus bridge logic.

15. The method of claim 9 further comprising:
disposing an auxiliary input on said chip.

16. A method for operating a tuning system, said method comprising:
receiving a signal from a broadband medium, said signal including desired information;
tuning said signal to retrieve said information from said broadband signal by removing unwanted frequencies;
providing said information to an input/output (IO) bus bridge;
driving logic performing said tuning and said IO bus bridge by a same clock; and
outputting said information to a computer bus.

17. The method of claim 16 wherein said logic performing said tuning and said IO bus bridge are formed at least partly on a same semiconductor chip, and wherein some of said logic is implemented in Complementary Metal Oxide Semiconductor (CMOS) logic and other of said logic is implemented in silicon germanium (SiGe) logic.

18. The method of claim 16 further comprising:
converting said information into digital information, wherein logic performing said converting is disposed on said semiconductor chip.

19. The method of claim 16 further comprising:
driving said logic performing said converting using said same clock.

20. The method of claim 16 further comprising:
demodulating said information; and
presenting said information to a user through a computer monitor.

21. A system for processing signals, said system comprising:
a Radio Frequency (RF) input;
an RF tuner in communication with said RF input configured to receive RF signals, to filter unwanted channels from said RF signals, and to generate output signals therefrom;
an Analog to Digital Converter (ADC) in communication with said RF tuner, configured to receive said output signals from said tuner and to generate digital output signals from the received tuner output signals;
an input/output (I/O) bus bridge configured receive said digital output signals and to drive said signals on a processor bus of a host computing device, wherein said tuner, said ADC and said I/O bus bridge are formed at least in part on a same semiconductor chip; and
an oscillating device in communication with each of said RF tuner, said ADC, and said I/O bus bridge, adapted to provide a clock signal thereto, wherein said RF tuner, said ADC, and said IO bus bridge are synchronized by said clock signal.

22. The system of claim 21 further comprising:
a host computing device interfaced with said I/O bus bridge and executing a software based demodulator adapted to receive and demodulate said driven signals, said host computing device including:
one or more user interface devices adapted to deliver human-perceptible signals based on said demodulated signals to a human user.

* * * * *

UNITED STATES PATENT AND TRADEMARK OFFICE
CERTIFICATE OF CORRECTION

| | | |
|---|---|---|
| PATENT NO. | : 7,813,707 B2 | Page 1 of 1 |
| APPLICATION NO. | : 11/557365 | |
| DATED | : October 12, 2010 | |
| INVENTOR(S) | : Timothy M. Magnusen et al. | |

It is certified that error appears in the above-identified patent and that said Letters Patent is hereby corrected as shown below:

Column 2, Line 61, delete the portion of text reading "Furthers" and replace with --Further--.

Column 4, Line 53, delete the portion of text reading "(SIP)" and replace with --(S/P)--.

Column 4, Line 66, delete the portion of text reading "laster" and replace with --faster--.

Column 6, Line 18, delete the portion of text reading "tan" and replace with --than--.

Column 6, Line 42, delete the portion of text reading "resynchronizes" and replace with --resynchronizers--.

In the Claims:

Column 8, Claim 12, Line 5, delete the portion of text reading "with said s" and replace with --with said--.

Signed and Sealed this

Fourteenth Day of December, 2010

David J. Kappos
*Director of the United States Patent and Trademark Office*